United States Patent
Bandyopadhyay et al.

(10) Patent No.: US 9,641,635 B2
(45) Date of Patent: May 2, 2017

(54) DYNAMIC SELECTION OF RELIABILITY OF PUBLISHING DATA

(71) Applicant: Tata Consultancy Services Limited, Mumbai (IN)

(72) Inventors: Soma Bandyopadhyay, Kolkata (IN); Abhijan Bhattacharyya, Kolkata (IN)

(73) Assignee: Tata Consultancy Services Limited (IN)

( * ) Notice: Subject to any disclaimer, the term of this patent is extended or adjusted under 35 U.S.C. 154(b) by 130 days.

(21) Appl. No.: 14/422,247

(22) PCT Filed: Aug. 22, 2013

(86) PCT No.: PCT/IN2013/000510
§ 371 (c)(1),
(2) Date: Feb. 18, 2015

(87) PCT Pub. No.: WO2014/049603
PCT Pub. Date: Apr. 3, 2014

(65) Prior Publication Data
US 2015/0195368 A1    Jul. 9, 2015

(30) Foreign Application Priority Data

Aug. 28, 2012 (IN) .......................... 2493/MUM/2012

(51) Int. Cl.
*G06F 15/16* (2006.01)
*H04L 29/08* (2006.01)
*H04L 12/26* (2006.01)

(52) U.S. Cl.
CPC .......... *H04L 67/26* (2013.01); *H04L 43/0805* (2013.01)

(58) Field of Classification Search
CPC ..... H04L 67/26; H04L 43/0805; H04L 29/08; H04L 12/26
See application file for complete search history.

(56) References Cited

U.S. PATENT DOCUMENTS 7,548,534 B2    6/2009    Zimmerman et al.
8,028,085 B2    9/2011    Elien et al.
(Continued)

OTHER PUBLICATIONS

Akram Hakiri, Pascal Berthou, Thierry Gayraud ; Université Toulouse, France, "Addressing the Challenge of Distributed Interactive Simulation With Data Distribution Service" Retrieved date 2015.

(Continued)

*Primary Examiner* — Cheikh Ndiaye
(74) *Attorney, Agent, or Firm* — Finnegan, Henderson, Farabow, Garrett & Dunner, L.L.P.

(57) ABSTRACT

A system and method for dynamic selection of reliability by data publishing protocol while publishing data, comprising a constrained gateway device (102) being adapted to publish data by using a data publisher and adapted to send and receive acknowledgment messages, one or more subscriber devices (104) communicatively coupled with the constrained gateway device (102) and subscribed to the server (106) and adapted to send and receive acknowledgment messages, and a server (106) communicatively coupled with the constrained gateway device (102) and the one or more subscriber devices (104) and adapted to exchange the acknowledgement messages between the data publisher on the constrained gateway device (102) and the one or more subscriber devices (104) wherein the data publisher running on the constrained gateway device (102) has multiple reliability levels for publishing data and is adapted to dynamically select the reliability level based on available bandwidth and energy.

16 Claims, 5 Drawing Sheets

(56) References Cited

U.S. PATENT DOCUMENTS

| | | | |
|---|---|---|---|
| 8,149,771 B2 | 4/2012 | Khivesara et al. | |
| 8,155,137 B2 | 4/2012 | Malledant et al. | |
| 8,185,146 B2 | 5/2012 | Dinan et al. | |
| 8,194,556 B2 | 6/2012 | Tacconi et al. | |
| 8,514,861 B2 | 8/2013 | Barker, Jr. et al. | |
| 8,874,804 B2 * | 10/2014 | Alshaikh | 703/10 |
| 2005/0096928 A1 * | 5/2005 | Ruggaber | H04L 12/18 709/220 |
| 2006/0146991 A1 | 7/2006 | Thompson et al. | |
| 2006/0149787 A1 * | 7/2006 | Surlaker | G06F 9/546 |
| 2006/0248181 A1 * | 11/2006 | Glassco | H04L 67/322 709/223 |
| 2006/0277319 A1 | 12/2006 | Elien et al. | |
| 2007/0153789 A1 | 7/2007 | Barker et al. | |
| 2007/0180119 A1 | 8/2007 | Khivesara et al. | |
| 2009/0103534 A1 | 4/2009 | Malledant et al. | |
| 2009/0147737 A1 | 6/2009 | Tacconi et al. | |
| 2009/0300525 A1 | 12/2009 | Jolliff et al. | |
| 2011/0019627 A1 | 1/2011 | Krishnaswamy et al. | |
| 2011/0021236 A1 | 1/2011 | Dinan et al. | |
| 2011/0022705 A1 * | 1/2011 | Yellamraju | H04L 65/1069 709/224 |
| 2011/0134934 A1 * | 6/2011 | Arroyo | H04L 12/5695 370/431 |
| 2011/0239287 A1 | 9/2011 | Pak et al. | |
| 2012/0106416 A1 | 5/2012 | Zheng et al. | |
| 2012/0272252 A1 * | 10/2012 | Beardsmore | G06F 9/542 719/328 |

OTHER PUBLICATIONS

Urs Hunkeler, Hong Linh Truong and Andy Stanford-Clark; IBM Zurich Research Laboratory, Switzerland / IBM UK Laboratories, Hursley, UK , "MQTT-S—A Publish/Subscribe Protocol for Wireless Sensor Networks" Jan. 2008.

Chiehyih Wan, Shane B. Eisenman and Andrew T. Campbell ; Dept. of Electrical Engineering , Columbia University, New York, "CODA: Congestion Detection and Avoidance in Sensor Networks"Sep. 3, 0011.

Joseph P. Loyall,1 Matthew Gillen,1 Aaron Paulos,1 Larry Bunch,2 Marco Carvalho, James Edmondson, Douglas C. Schmidt, Andrew Martignoni III, and Asher Sinclair , "Dynamic Policy-Driven Quality of Service in Service-Oriented Information Management Systems" Retrieved date 2015.

Ming Xiong, Jeff Parsons, James Edmondson, Hieu Nguyen, and Douglas C Schmidt / Vanderbilt University, Nashville TN, USA , "Evaluating the Performance of Publish/Subscribe Platforms for Information Management in Distributed Real-time and Embedded Systems" Retrieved date 2015.

International Search Report mailed on Mar. 28, 2014, in International Application No. PCT/IN2013/000510 (2 pages.).

* cited by examiner

DYNAMIC SELECTION OF RELIABILITY OF PUBLISHING DATA

CROSS-REFERENCE TO RELATED PATENT APPLICATIONS

This application is a National Stage Entry under 35 U.S.C. §371 of International Application No. PCT/IN2013/000510, filed on Aug. 22, 2013, which claims priority from Indian Patent Application No. 2493/MUM/2012, filed on Aug. 28, 2012. The entire contents of the above-referenced applications are expressly incorporated herein by reference for all purposes.

FIELD OF THE INVENTION

This invention relates in general to the field of message communication within a publisher and subscriber network. More particularly, the invention relates to the field of ubiquitous computing and Internet of Things. Particularly, the invention relates to the sensor data publishing, specifically when the data publisher has limitations of resources like network bandwidth, energy and operates on constrained gateway devices.

BACKGROUND OF THE INVENTION

Distribution of data such as news, events, notifications, files, media-clips and other application data to and from multiple devices operating in a network is ubiquitous today. The broadcasting of data to multiple mobile devices from one or more data broadcasters or sensors, and also broadcasting of data by the multiple mobile devices operating in a wireless network may involve a plurality of problems in terms of network resource usage or due to network bandwidth limitations. Usually, the device broadcasting the message may be referred to as a publisher and the receiver of the broadcasted message may be referred to as a subscriber. The communication between a data publisher and a subscriber is an essential characteristic feature in a message publication environment, where both the systems are decoupled with respect to each other. The data publisher sends data to a subscriber through a server. Such a server may act as a message data store, a subscription store, and an interlocutor between the two components.

Within a particular message publishing system, messages may generally be delivered through a network of servers which provide routing services. Such communications often have an associated "quality of service" which determines the manner in which the servers process the message. The quality of service depends on factors such as network bandwidth requirements, throughput, latency, error rate, compression, or the amount of memory or buffer space required for a data flow. The message publishing system includes a set of one or more publishers sending communications to a set of one or more subscribers who have subscribed their interest to a server in receiving communications of that type. Publish/subscribe allows subscribing users to receive the very latest information in an area of interest. A typical environment having a number of publishers sending messages to a broker/server that in turn sends the messages to a number (potentially a very large number) of subscribers located on remote computing devices across the network.

However, the use of mobile wireless devices such as mobile phones, PDAs, and wirelessly connected other battery operated devices, introduces a plurality of factors into any system designed to deliver data to applications executing on those devices for example, a situation in which a mobile device must communicate with a central data store or server over a wireless network, the device may face bandwidth constraints, latency concerns, intermittent connectivity problems, power constraints, and prohibitive cost into any system designed to transfer data and content to a user of a client device. In addition, the lower available bandwidth and energy of the device may place constraints on the type or complexity of the data or content that can be effectively delivered. Similarly, latency and intermittent connectivity concerns may impact the ability of the subscriber device to communicate with a source of data or content to confirm delivery of content. Therefore, there arises a need for optimizing the resource usage such as energy and bandwidth of the data publisher and managing Quality of Service.

The existing art attempts to resolve various issues involved in the data publishing systems. For example, U.S. Pat. No. 8,028,085 describe reducing the latency of a message exchange by removing the latency component which is the message queue for systems where the publishers and subscribers are residing at the same process space. However, it does not specify any method for publisher side Quality of Service management with optimized resource usage like energy as well as network bandwidth.

Further, US 2003/0115317 describes the subscriber-specified quality of service requirements as well as message characteristics and consequently to select an appropriate communication protocol by the message broker/server. The server also balances the reliability requirement and optimized message performance. However, this also does not specify any scheme for publisher side QoS management.

U.S. Pat. No. 7,548,534 talks about the MAC layer's (layer 2) bandwidth allocation policy and how dynamically bandwidth allocation is made by base station scheduler based on connection priority of each physical channel bandwidth grant can be varied. U.S. Pat. No. 8,149,771 talks about a dynamic bandwidth allocation mechanism among multiple applications by an event scheduler. It works particularly on the broadcast data. It ensures a reliability level when the application operates on the assigned bandwidth, however does not dynamically vary the reliability level during data publishing, and does not optimize the usage of bandwidth and power together. It does not require running on any constrained device. US 20060146991 proposes an end to end middleware architecture, which uses a publish-subscribe messaging system. Such a messaging system uses topic based mechanism. It provides management, control, data routing, software and firmware version control and update management and scheduling, further comprises one or more caching engines connected to respective one or more of the messaging appliances. The messaging system monitors performance metrics including network bandwidth, message flow rates, frame rates, messaging hop latency, end-to-end latency, and system behavior and protocol optimization services. It further operates to control resources associated with message communication paths based on the performance metrics. US 20090147737 talks about the WiMAX MAC layer's (layer 2) bandwidth allocation policy, how dynamically bandwidth allocation is made by base station scheduler, depending on the request made by the subscriber station using prediction of the number of packets need to be transmitted. Here the Tx queue length is dependent on the number of packets predicted to arrive into the queue by the time of the grant arrival, adjusted by the difference between the measured average delay and the target delay and does not talk about managing the publisher side QoS. Similarly, U.S. Pat. No. 7,406,537, US 20030135556, U.S. Pat. No. 7,424,549, US 20100002692, U.S. Pat. No. 7,970,918 do not talk managing the quality of service at the publisher's side.

However, the above mentioned prior art documents do not describe varying the reliability/QoS of a data publishing protocol, dynamically by a publisher while publishing the data and thus utilizing the resources like bandwidth and energy optimally as a constrained gateway device. Also, none of the existing arts come up with a proposal to define a relationship between the data publishing queue, sleep cycles and data publishing cycles. Thus, none of the schemes described in the existing arts is able to counter the problem of optimizing the resource usage like energy as well as bandwidth as data publisher as a constrained device, and acting as sensor gateway.

Further, the systems in the state of the art are not aware of any mechanism of generating a relationship among the data publishing queue, sleep and data publishing cycles while acting as data publisher and running on constrained gateway.

In view of the issues explained above, there is a growing need for improved methods and systems for managing publisher side Quality of Service with optimized resource usage like energy as well as network bandwidth. The present application describes varying the reliability of the published data based on the publisher's state and resource condition. It further specifies a method for publisher side Quality of Service management, optimizing the resource usage like energy as well as bandwidth based on dynamically varying the reliability level of the published message, depending on availability of bandwidth, the transmit queue size and priority of the data to be published at the publisher. The solution provided by the application also offers performance enhancement in terms of optimally using the resources like bandwidth and energy.

OBJECTS OF THE INVENTION

The primary objective of the present application is to provide a system and method for managing publisher side Quality of Service with optimized resource usage like energy as well as network bandwidth.

It is another objective of the present invention to provide a system and method for dynamically varying the reliability level of the published message, availability of bandwidth, based on the publishing data queue size and priority of the data to be published at the publisher.

It is yet another objective of the present invention to provide a method for defining a relationship between the data publishing queue, sleep cycles and data publishing cycles.

SUMMARY

Embodiments of the present invention are directed to a system for dynamic selection of reliability by data publishing protocol while publishing data. In an embodiment, the system comprises of a constrained gateway device, one or more subscriber devices and a server. The constrained gateway device may be adapted to publish data by utilizing a data publisher. In addition, the constrained gateway device may also be adapted to send and receive one or more acknowledgment messages during data publication. In an embodiment, the constrained gateway device may be adapted to dynamically lower the reliability level of publishing data if the queue size of the data for publishing and the time difference between the data publishing cycles and sleep cycles reaches a cutoff value or if the channel condition degrades from a cutoff level. In another embodiment, the constrained gateway device may be adapted to dynamically increase the reliability of publishing data based on the priority of the data, or simply for every data it publishes if the channel condition indicates fair and the indicator is above a cutoff level. In an aspect, the constrained gateway device may be a mobile device such as a mobile phone, tablet, PDA, and the like with certain network bandwidth and energy limitations. In another aspect, the constrained gateway device may be embedded with multiple sensors and may also be adapted to communicate with certain external sensors. In yet another aspect, the constrained gateway device may maintain a fixed duration of sleep cycles. In an embodiment, the data publisher running on the constrained gateway device may start publishing data from highest level of reliability and the one or more subscribed devices may be adapted to listen in highest level of reliability. In another embodiment, the data publisher may maintain relations among a transmit queue length of published data, data publishing cycles and sleep cycles. The one or more subscriber devices may be communicatively coupled with the constrained gateway device and subscribed to the server and may be adapted to send and receive one or more acknowledgment messages. The server is communicatively coupled with the constrained gateway device and the one or more subscriber devices. The server may be adapted to exchange the acknowledgement messages between the data publisher on the constrained gateway device and the one or more subscriber devices. Particularly, the data publisher running on the constrained gateway device may have multiple levels of reliability of publishing data and may be adapted to dynamically select the reliability level based on available bandwidth and energy and for optimizing the use of energy and bandwidth of the constrained gateway device.

Other embodiments of the present invention are directed to a method for dynamic selection of reliability by data publishing protocol while publishing data. The method comprises of selecting a reliability level of publishing data by a data publisher running on constrained gateway device and sending the publishing data to a server. In an aspect, the reliability level of publishing data defines the number of messages to be sent from the publisher's side as acknowledgement of the received publish completion acknowledgement message. The data is received by the server and thereupon transmitted to a subscriber device being subscribed to the server. The server may send an acknowledgement message to the constrained gateway device for confirming the transmission of the data. The subscriber device upon receiving the published data sends a publish completion acknowledgement message to the constrained gateway device via the server. In an aspect, the publishing of data by the constrained gateway device may start with the data publisher selecting the highest reliability level for publishing and the subscriber receiving the data in highest reliability level.

In an embodiment, the step of selecting the reliability level of publishing data by the data publisher of the constrained gateway device comprises of calculating the time when to modify the reliability level (Tcutoff) based on the time difference between two consecutive data publishing cycles (Tpc), maximum length of the data publishing queue Qm, and cutoff value of transmit queue-length (Qcutoff) which varies system to system, using the inputs of bandwidth condition and sleep cycles, and there by optimizing the use of energy and bandwidth of the constrained gateway device.

In another related embodiment, the step of optimizing the use of energy and bandwidth of the constrained gateway device comprises of either dynamically lowering the reliability level of publishing data if the queue size of the data for publishing, and the time difference between the data publishing cycles and sleep cycles reaches a cutoff value or if the channel condition degrades from a cutoff level and is also adapted; or dynamically increasing the reliability level of publishing data if the channel condition indicates fair and the indicator is above a cutoff level.

In an aspect, the step of dynamically lowering the reliability of publishing data may comprise of ignoring acknowledgement messages to be sent for the already published message based on its level of reliability, and choosing the next priority data to be published. This in turn reduces the overall duration of data publishing and total data traffic to be sent, thus reduces the usage of energy as well as bandwidth.

In an aspect, the step of dynamically increasing the reliability of publishing data comprises determining if the queue length of data to be published is less than ½ Qcutoff and rate of data publishing—is nearly same, and bandwidth is not changing during two consecutive data publishing cycles. In another aspect, the step of dynamically increasing the reliability level of publishing data is based on the priority of the data, or simply for every data it publishes. In a related embodiment, the step of determining if the queue length of data to be published is less than ½ Qcutoff comprises of determining if $Tpc=(Tp/Ql) Qm$, wherein Tpc denotes the time difference between two consecutive data publishing cycles, Ql denotes the queue length of the data to be published, Tp denotes total time needed to publish messages based on its reliability level and get an acknowledgement back, and Qm denotes the maximum length of the data publishing queue.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific system and method disclosed in the drawings.

DETAILED DESCRIPTION OF THE INVENTION

Some embodiments of this invention, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise.

Although any systems and methods similar or equivalent to those described herein can be used in the practice or testing of embodiments of the present invention, the preferred, systems and methods are now described.

Figure 1:
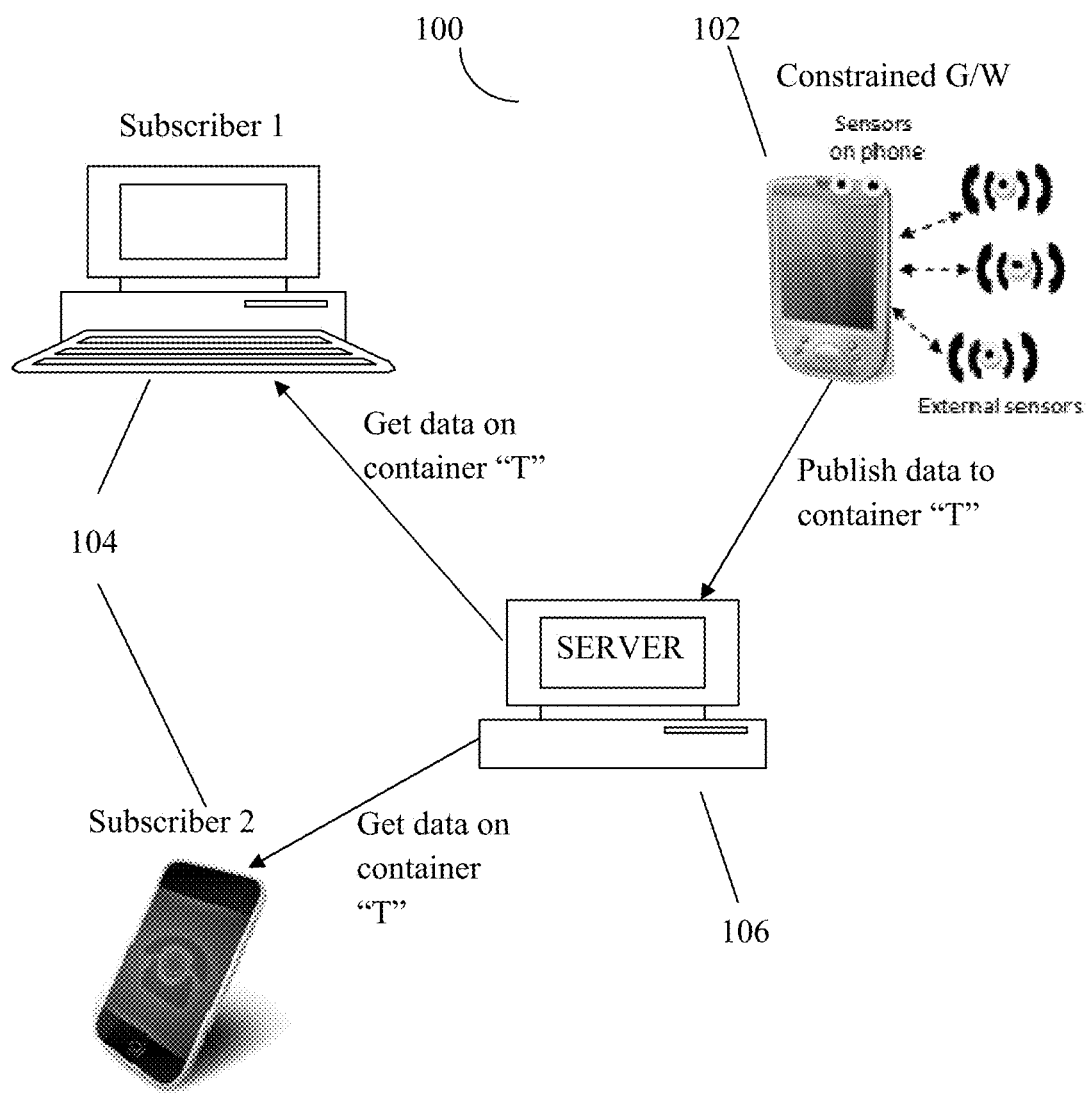
FIG. 1 is a schematic representation of a publishing system in which a constrained gateway device on which a publisher application is running and one or more subscriber devices on which subscriber applications are running communicate via a server, and in which the present invention may be implemented.

FIG. 1 is a schematic representation of a publishing system (100) in which a constrained gateway device on which a publisher application is running and one or more subscriber devices on which subscriber applications are running communicate via a server, and in which the present invention may be implemented.

The publishing system (100) may comprise of a constrained gateway device (102), one or more subscriber devices (104) and a server (106). The constrained gateway device may be adapted to publish data by utilizing a data publisher. The data publisher is running on the constrained gateway device (102) to which one or more subscriber devices (104) may be subscribed to. In addition, the constrained gateway device (102) may also be adapted to send and receive one or more acknowledgment messages. In an aspect, the one or more acknowledgment messages may be a complete publishing data transfer message sent by the constrained gateway device to the server.

In an embodiment, the constrained gateway device (102) may be adapted to dynamically lower the reliability level of publishing data if the queue size of the data for publishing and the time difference between the data publishing cycles and sleep cycles reaches a cutoff value or if the channel condition degrades from a cutoff level. In another embodiment, the constrained gateway device (102) may be adapted to dynamically increase the reliability of the publishing data based on the priority of the data, or simply for every data it publishes if the channel condition indicates fair and the indicator is above a cutoff level. The constrained gateway device (102) may be a mobile device such as a mobile phone, tablet, PDA, and the like with certain constraints such as network bandwidth and energy limitations. The constrained gateway device may be embedded with multiple sensors and may also be adapted to communicate with certain external sensors as further explained in FIG. 2. The constrained gateway device may maintain a fixed duration of sleep cycles.

In an embodiment, the data publisher running on the constrained gateway device (102) may start publishing data from highest level of reliability and the one or more subscribe devices (104) may be adapted to listen in highest level of reliability. In another embodiment, the data publisher may maintain relations among a transmit queue length of published data, data publishing cycles and sleep cycles. The one or more subscriber devices may be communicatively coupled with the constrained gateway device and subscribed to the data publisher and may be adapted to send and receive one or more acknowledgment messages. The server (106) is communicatively coupled with the constrained gateway device and the one or more subscriber devices. The server (106) may be adapted to exchange the acknowledgement messages between the data publisher on the constrained gateway device and the one or more subscriber devices. Particularly, the data publisher running on the constrained gateway device may have multiple levels of reliability of publishing data and may be adapted to dynamically select the reliability level based on available bandwidth and energy and optimizes the use of energy and bandwidth of the constrained gateway device.

Figure 2:
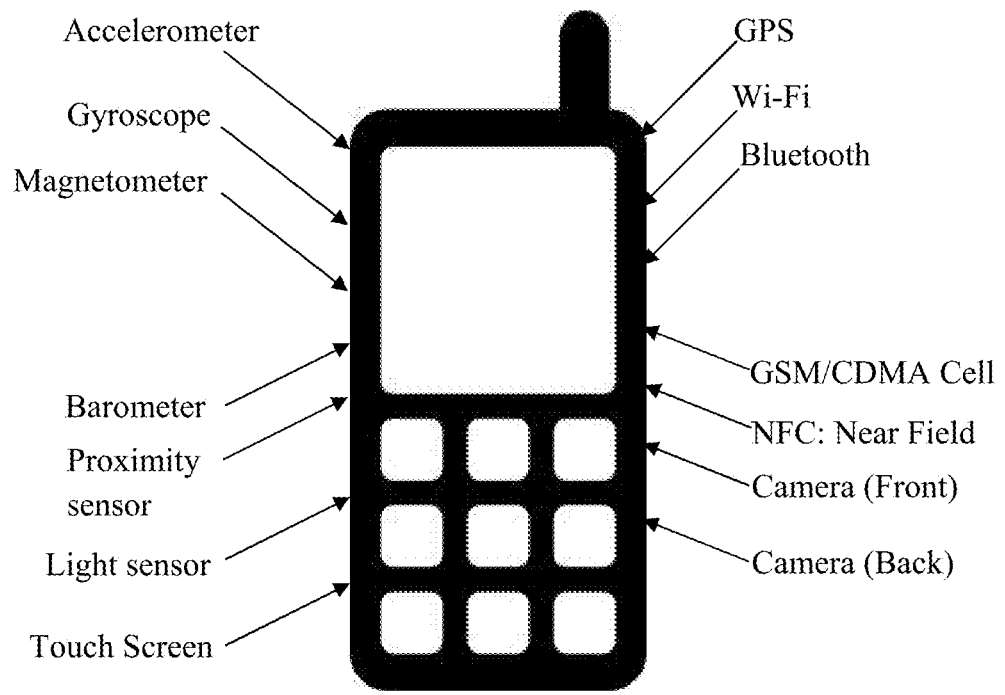
FIG. 2 according to an exemplary embodiment illustrates a constrained gateway device having a data publisher application.

FIG. 2 according to an exemplary embodiment illustrates a constrained gateway device having a data publisher application. The constrained gateway device is represented as a mobile phone but the same may be a mobile device such as a tablet, PDA, or other battery operated devices wirelessly connected to the network, and the like. The constrained gateway device may be embedded with a plurality of sensors such as GPS, Accelerometer, Proximity sensor, NFC, etc. as shown in FIG. 2. Further, the constrained gateway device may be augmented with more external sensors such as ECG meter, temperature sensor and the like by utilizing small range wireless connections like Bluetooth, WiFi, etc. The constrained gateway device acts as a gateway to share a plurality of sensor data to the external world. The published data is communicated to a server that may act as a broker/proxy. The subscriber devices get the data from the server as and when the server is updated. In an aspect, the subscriber devices may be constrained devices.

Figure 3:
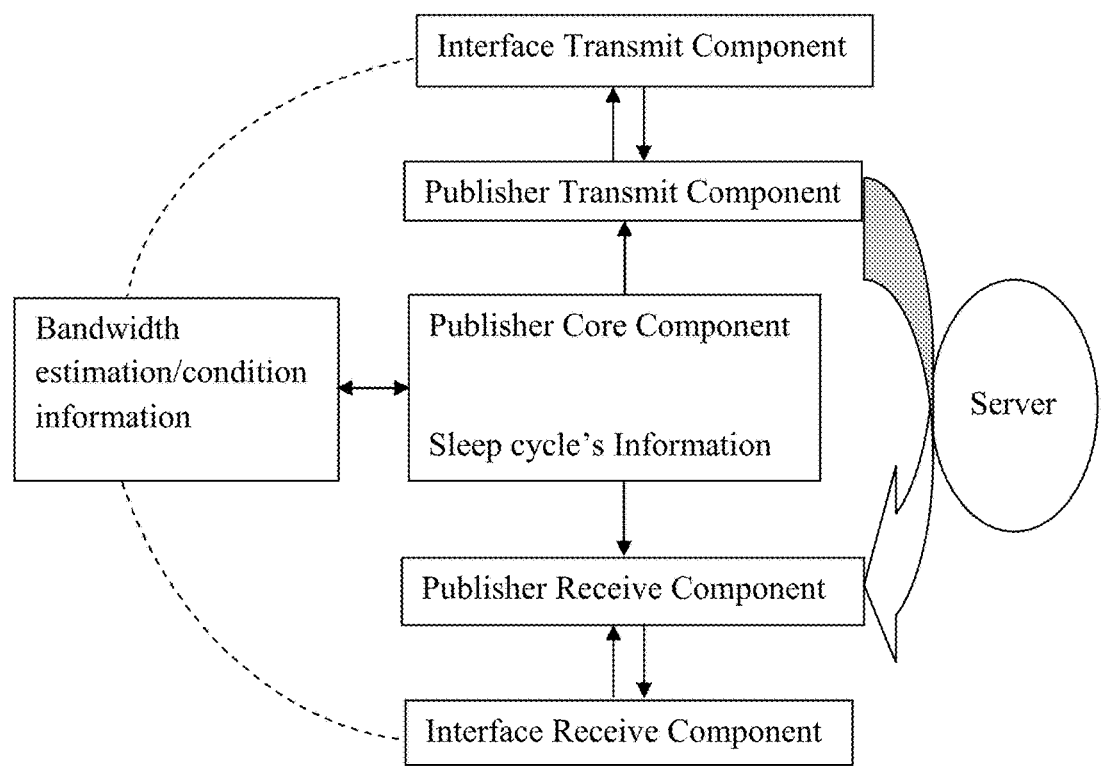
FIG. 3 is a schematic representation of the system architecture showing the components of publisher interacting with the server.

FIG. 3 is a schematic representation of the system architecture showing the components of publisher interacting with the server. The publisher has a transmit component that sends the data/message or acknowledgements to the server and a receive component that receives acknowledgements from the server. Further, the publisher includes a publisher core component that retains the sleep cycle information of the constrained gateway device on which the publisher is running. Further, an interface transmit component and interface receive component are also present that monitor the information regarding the network bandwidth available to the constrained gateway device at any given time.

Figure 4:
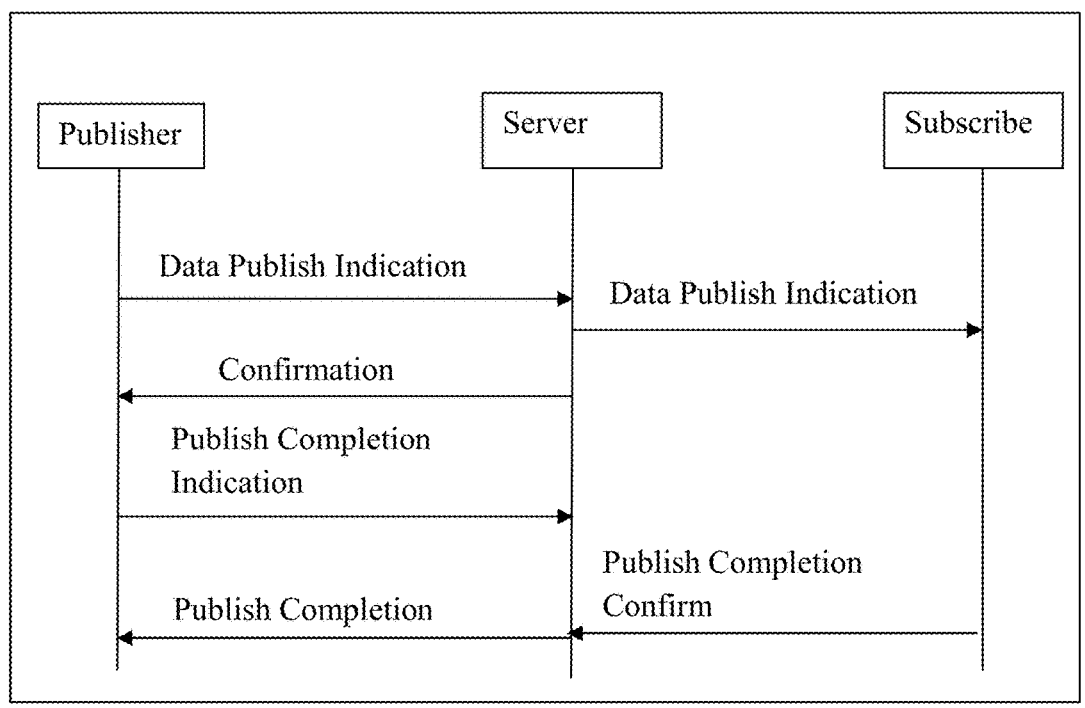
FIG. 4 is a schematic representation of a typical publisher/subscriber communication process.

FIG. 4 is a schematic representation of a typical publisher/subscriber communication process. The publisher sends a data publish indication along with the data to be published to the server. The server maintaining the message queue for every subscriber in the system sends the data publish indication the subscriber that is subscribed to the server. Upon sending the data to the subscriber the server sends a confirmation acknowledgement to the publisher. The publisher sends a publish completion indication to the server once the publication of data is over. The subscriber also sends a confirmation acknowledgement to the server once it has received the published data. Once, the server receives the confirmation from the subscriber, the server sends a publish completion acknowledgement to the publisher indicating the completion of the publication.

Figure 5:
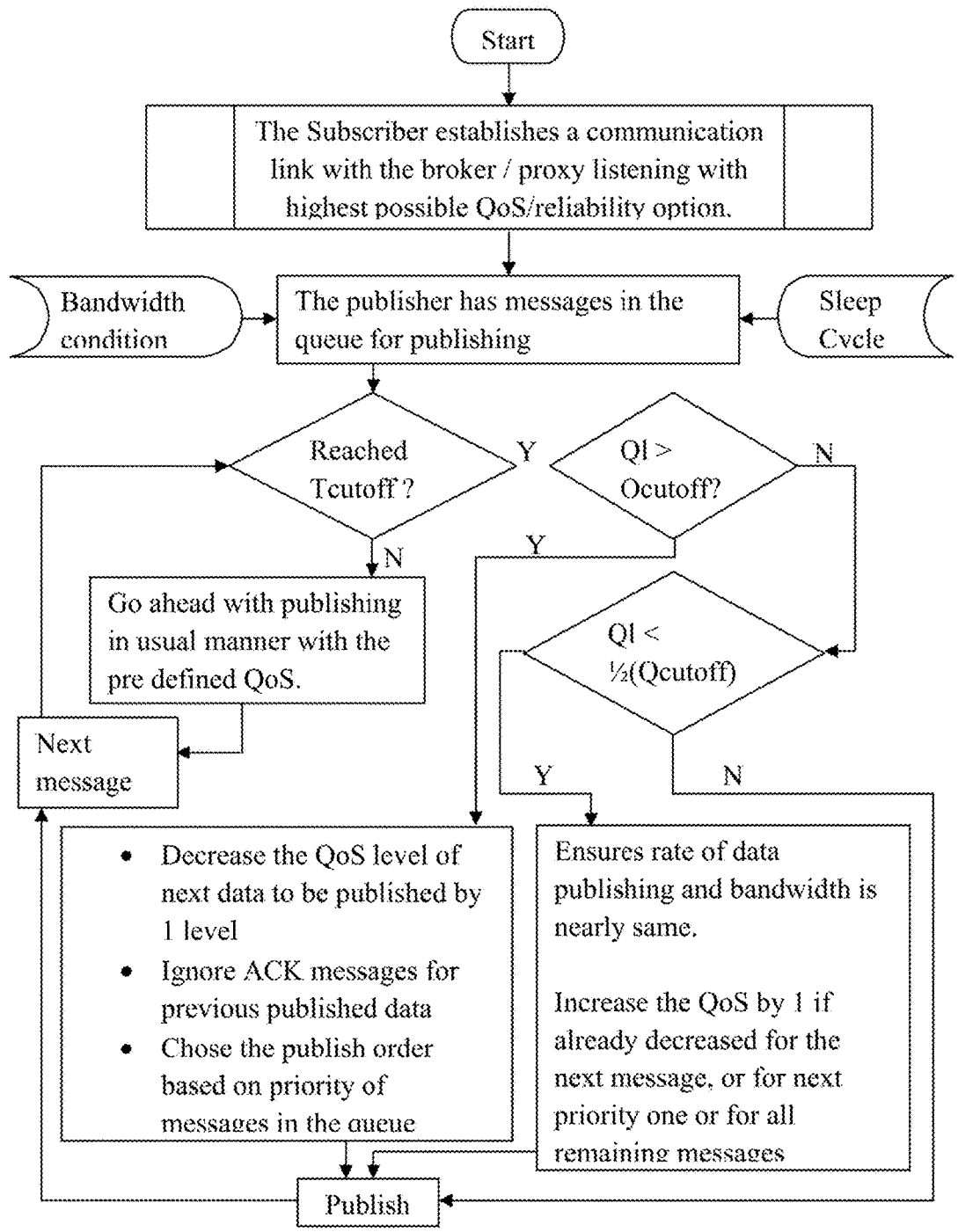
FIG. 5 represents an execution flow diagram describing dynamically varying publisher side Quality of Service, according to an exemplary embodiment.

FIG. 5 represents an execution flow diagram describing variation of publisher side Quality of Service, according to an exemplary embodiment. The publishing method optimally uses resources such as energy and network bandwidth. The reliability level for publishing data is dynamically varied during data publishing. Further, a relation is established among the transmit queue length of published data, data publishing cycles and sleep cycles of the constrained device.

The Queue length of published data or the Number of messages to be published stored into the data transmit queue is denoted by Ql. The Maximum length of the queue is denoted by Qm. The time difference between two consecutive data publishing or the time duration of a complete data publishing cycle is denoted by Tpc. The time period of the sleep cycle of the constrained gateway device is denoted by Ts. The sleep cycle is fixed time interval during which the constrained gateway device sleeps. The constrained device maintains a fixed duration of sleep cycles, and has a multiple level of reliability. It may start from a highest level of reliability. Further, the subscriber device may start with listening in highest level of reliability. A non active period before the constrained gateway device goes to sleep may be denoted by Tn. Further, the total time needed to publish messages based on its reliability level and get an acknowledgement back may be denoted by Tp. In an aspect, the reliability level may be defined as the number of messages to be sent from the publisher's side as acknowledgement of the received acknowledgement of the data publish message.

The total time needed to publish messages based on its reliability level and get an acknowledgement back may be described as a function of network bandwidth, reliability level, length of individual data/message to be published. i.e.

$$Tp = f(\text{bandwidth, reliability level, length of individual data/message to be published}); \quad (1a)$$

Further, the time difference between two consecutive data publishing or the time duration of a complete data publishing cycle may be described as a function of network bandwidth and reliability level. i.e.

$$Tpc = f(\text{bandwidth, reliability level}); \quad (1b)$$

$$\text{Therefore, } Tcutoff = [(Tpc/Qm)Qcutoff]. \text{ Hence,}$$
$$Tcutoff = f(Tp, Qcutoff) \quad (2)$$

$$Ql = f(Tp) \quad (3)$$

When Tcutoff reaches but Ql>Qcutoff at that point of time publisher modifies the reliability level of the messages to be published i.e. lowers it instead of $2^{nd}$ level changes to $1^{st}$ level and so on. During this time it ignores the ACK messages to be sent for the already published message based on its level of reliability, and chooses the next priority data to publish.

In case bandwidth decreases Tp increases and Ql increases and if the above condition arrives publisher decreases the reliability and performs the same actions. In cases when it has less number of data to post i.e. less than ½ Qcutoff and Tpc=(Tp/Ql)Qm, rate of data publishing is nearly same and bandwidth is not changing during Tpc, it enhances the reliability level depending on the priority of the data, or simply for every data it publishes.

Other embodiments of the present invention are directed to a method for dynamic selection of reliability by data publishing protocol while publishing data. The method comprises of selecting a reliability level of publishing data by a data publisher running on constrained gateway device and sending the publishing data to a server. In an aspect, the reliability level of publishing data defines the number of messages to be sent from the publisher's side as acknowledgement of the received publish completion acknowledgement message. The data is received by the server and thereupon transmitted to a subscriber device being subscribed to the server. The server may send an acknowledgement message to the constrained gateway device for confirming the transmission of the data. The subscriber device upon receiving the published data sends a publish completion acknowledgement message to the constrained gateway device via the server. In an aspect, the publishing of data by the constrained gateway device may start with the data publisher selecting the highest reliability level for publishing and the subscriber receiving the data in highest reliability level.

In an embodiment, the step of selecting the reliability level of publishing data by the data publisher of the constrained gateway device comprises of calculating the time when to modify the reliability level (Tcutoff) based on the time difference between two consecutive data publishing cycles (Tpc), maximum length of the data publishing queue Qm, and cutoff value of transmit queue-length (Qcutoff) which varies system to system, using the inputs of bandwidth condition and sleep cycles, and thereby optimizing the use of energy and bandwidth of the constrained gateway device.

In another related embodiment, the step of optimizing the use of energy and bandwidth of the constrained gateway device comprises of either dynamically lowering the reliability level of publishing data if the queue size of the data for publishing, and the time difference between the data publishing cycles and sleep cycles reaches a cutoff value or if the channel condition degrades from a cutoff level and is also adapted; or dynamically increasing the reliability level of publishing data if the channel condition indicates fair and the indicator is above a cutoff level.

In an aspect, the step of dynamically lowering the reliability of publishing data may comprise of ignoring acknowledgement messages to be sent for the already published message based on its level of reliability, and choosing the next priority data to be published.

In an aspect, the step of dynamically increasing the reliability of publishing data comprises determining if the queue length of data to be published is less than ½ Qcutoff and rate of data publishing is nearly same, and bandwidth is not changing during data publishing cycles. In another aspect, the step of dynamically increasing the reliability level of publishing data is based on the priority of the data, or simply for every data it publishes. In a related embodiment, the step of dynamically increasing the reliability level of publishing data is if the queue length of data to be published is less than ½ Qcutoff and if Tpc=(Tp/Ql)Qm, wherein Tpc denotes the time difference between two consecutive data publishing, Ql denotes the queue length of the data to be published, Tp denotes total time needed to publish messages based on its reliability level and get an acknowledgement back, and Qm denotes the maximum length of the data publishing queue.

Although in portions of the following description the present invention will be discussed with reference to mobile wireless devices operating in a wireless network, it is to be understood that that the inventive systems, apparatus and methods are generally applicable to other types of devices as well, and to networks other than wireless networks (e.g., fixed high-speed bidirectional networks such as an Internet based communications networks, or fixed or wireless bidirectional networks in which communication in one direction is faster than in the other). Applicable devices include, for example, ATM machines, informational kiosks, vending machines, and navigation systems. One example of a situation in which the present invention would be applicable would be an automobile navigation system where there is no or only limited ability for the user device to communicate with the source of the data. Another example is that of an information kiosk that may have limited upstream communications capabilities. In general, the present invention is most applicable to client devices where there is a broadcast mechanism or other efficient data distribution mechanism in one direction (network to many devices), but there is not an efficient/cost-effective or available two-way mechanism to pull data customized for each device. Although the invention provides significant benefits for such networks, as mentioned, in general it may be used in the context of high-speed fixed or wireless bidirectional networks with symmetric or asymmetric communications capabilities.

The methodology and techniques described with respect to the exemplary embodiments can be performed using a machine or other computing device within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in a server-client user network environment, or as a peer machine in a peer-to-peer (or distributed) network environment.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification. For example, the exemplary embodiments of the present invention were primarily directed to generation of regression test scripts. However, one skilled in the art would recognize the applicability to a variety of test scripts.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, means, methods and steps described in the specification. As one will readily appreciate from the disclosure, processes, machines, means, methods, or steps, presently existing or later to be developed that perform substantially the same function or achieve substantially the same result as the corresponding embodiments described herein may be utilized. Accordingly, the appended claims are intended to include within their scope such processes, machines, means, methods, or steps.

We claim:

1. A system for dynamic selection of reliability by data publishing protocol while publishing data, the system comprising:
 a constrained gateway device being adapted to publish data by using a data publisher and adapted to send and receive one or more acknowledgment messages;
 one or more subscriber devices communicatively coupled with the constrained gateway device and subscribed to a server and adapted to send and receive one or more acknowledgment messages; and
 the server communicatively coupled with the constrained gateway device and the one or more subscriber devices and adapted to exchange the acknowledgement messages between the data publisher on the constrained gateway device and the one or more subscriber devices;
 wherein the data publisher running on the constrained gateway device has multiple levels of reliability of publishing data and is adapted to: dynamically select a reliability level of publishing data based on available bandwidth and energy and send the publishing data to the server, wherein the reliability level of publishing data defines a number of messages to be sent from the publisher's side as acknowledgement of a publish completion acknowledgement message; and
 wherein to dynamically select the reliability level of publishing data, the data publisher running on the constrained gateway device is adapted to:
  calculate a time (Tcutoff) when to modify the reliability level based on a time difference between two consecutive data publishing cycles (Tpc), maximum length of a data publishing queue Qm, and cutoff of transmit queue-length (Qcutoff) (cutoff of transmit queue), and there by optimizing use of energy and bandwidth of the constrained gateway device; and
 wherein optimizing the use of energy and bandwidth of the constrained gateway device comprises:
 dynamically lowering the reliability level of publishing data if the queue length of the data for publishing and the time difference between the data publishing cycles and sleep cycles reaches a cutoff value, or if a channel condition degrades from a cutoff level; or
 dynamically increasing the reliability level of publishing data if the channel condition indicates fair and the indicator is above a cutoff level.

2. The system as claimed in claim 1 wherein, the constrained gateway device is a mobile device with network bandwidth and energy limitations and is also embedded with multiple sensors and is adapted to communicate with external sensors.

3. The system as claimed in claim 1 wherein, the constrained gateway device maintains a fixed duration of sleep cycles.

4. The system as claimed in claim 1 wherein, the data publisher starts from highest level of reliability and the subscriber listens in highest level of reliability.

5. The system as claimed in claim 1 wherein the data publisher maintains relations among a transmit queue length of published data, data publishing cycles and sleep cycles.

6. A method for dynamic selection of reliability by data publishing protocol while publishing data, the method comprising:
 selecting a reliability level of publishing data by a data publisher of a constrained gateway device and sending the publishing data to a server, wherein the reliability level of publishing data defines a number of messages to be sent from the publisher's side as acknowledgement of a publish completion acknowledgement message;
 receiving the publishing data by the server and transmitting the publishing data to a subscriber device being subscribed to the server;
 sending an acknowledgment message to the constrained gateway device by the server for confirming the transmission of the publishing data; and
 sending the publish completion acknowledgement message from the subscriber device to the constrained gateway device via the server;
 wherein selecting the reliability level of publishing data by the data publisher of the constrained gateway device comprises:
  calculating a time (Tcutoff) when to modify the reliability level based on a time difference between two consecutive data publishing cycles (Tpc), maximum length of a data publishing queue Qm, and cutoff of transmit queue-length (Qcutoff) (cutoff of transmit queue), and there by optimizing use of energy and bandwidth of the constrained gateway device and
 wherein optimizing the use of energy and bandwidth of the constrained gateway device comprises:
  dynamically lowering the reliability level of publishing data if the queue length of the data for publishing and the time difference between the data publishing cycles and sleep cycles reaches a cutoff value, or if a channel condition degrades from a cutoff level; or
  dynamically increasing the reliability level of publishing data if the channel condition indicates fair and the indicator is above a cutoff level.

7. The method as claimed in claim 6, wherein dynamically lowering the reliability of publishing data comprises ignoring acknowledgement messages to be sent for the already published message based on its level of reliability, and choosing a next priority data to be published.

8. The method as claimed in claim 6, wherein dynamically increasing the reliability of publishing data comprises determining if the queue length of data to be published is less than ½ Qcutoff and a rate of data publishing, and the bandwidth of the constrained gateway device does not changing during the data publishing cycles.

9. The method as claimed in claim 6, wherein dynamically increasing the reliability level of publishing data is based on priority of the publishing data.

10. The method as claimed in claim 6, wherein dynamically increasing the reliability level of publishing data is based on a queue length of data to be published, which is less than ½ Qcutoff and Tpc=(Tp/Ql) Qm, wherein Tpc denotes a time difference between two consecutive data publishing, Ql denotes a queue length of the data to be published, Tp denotes total time needed to publish messages based on its reliability level and receive an acknowledgement back, and Qm denotes a maximum length of the data publishing queue, wherein Tp and Tpc, Ql can be further expressed as functions of bandwidth, reliability level, and length of individual data to be published.

11. The method as claimed in claim 6, wherein the publishing of data by the constrained gateway device starts with the data publisher selecting a highest reliability level for publishing and the subscriber receiving the publishing data at the highest reliability level.

12. A non-transitory computer-readable medium comprising instructions, the instructions perform a method when executed by at least one processor, the method comprising:

selecting a reliability level of publishing data by a data publisher of a constrained gateway device and sending the publishing data to a server, wherein the reliability level of publishing data defines a number of messages to be sent from the publisher's side as acknowledgement of a publish completion acknowledgement message;

receiving the publishing data by the server and transmitting the publishing data to a subscriber device being subscribed to the server;

sending an acknowledgment message to the constrained gateway device by the server for confirming the transmission of the publishing data; and sending the publish completion acknowledgement message from the subscriber device to the constrained gateway device via the server;

wherein selecting the reliability level of publishing data by the data publisher of the constrained gateway device comprises:

calculating a time (Tcutoff) when to modify the reliability level based on a time difference between two consecutive data publishing cycles (Tpc), maximum length of a data publishing queue Qm, and cutoff of transmit queue-length (Qcutoff) (cutoff of transmit queue), and there by optimizing use of energy and bandwidth of the constrained gateway device; and wherein optimizing the use of energy and bandwidth of the constrained gateway device comprises:

dynamically lowering the reliability level of publishing data if the queue length of the data for publishing and the time difference between the data publishing cycles and sleep cycles reaches a cutoff value, or if a channel condition degrades from a cutoff level; or dynamically increasing the reliability level of publishing data if the channel condition indicates fair and the indicator is above a cutoff level.

13. The computer-readable medium as claimed in claim 12, wherein dynamically lowering the reliability of publishing data comprises ignoring acknowledgement messages to be sent for the already published message based on its level of reliability, and choosing a next priority data to be published.

14. The computer-readable medium as claimed in claim 12, wherein dynamically increasing the reliability of publishing data comprises determining if the queue length of data to be published is less than ½ Qcutoff and a rate of data publishing, and the bandwidth of the constrained gateway device does not changing during the data publishing cycles.

15. The computer-readable medium as claimed in claim 12, wherein dynamically increasing the reliability level of publishing data is based on priority of the publishing data.

16. The computer-readable medium as claimed in claim 12, wherein dynamically increasing the reliability level of publishing data is based on a queue length of data to be published, which is less than ½ Qcutoff and Tpc=(Tp/Ql) Qm, wherein Tpc denotes a time difference between two consecutive data publishing, Ql denotes a queue length of the data to be published, Tp denotes total time needed to publish messages based on its reliability level and receive an acknowledgement back, and Qm denotes a maximum length of the data publishing queue, wherein Tp and Tpc, Ql can be further expressed as functions of bandwidth, reliability level, and length of individual data to be published.

* * * * *